United States Patent
Sun et al.

(10) Patent No.: US 8,989,109 B2
(45) Date of Patent: Mar. 24, 2015

(54) PRE-CODING METHOD AND APPARATUS BASED ON MIXED MULTIPLEXING DEMODULATION REFERENCE SIGNALS

(75) Inventors: Yunfeng Sun, Guangdong Province (CN); Wenfeng Zhang, Guangdong Province (CN); Jing Jiang, Guangdong Province (CN); Junfeng Zhang, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 25 days.

(21) Appl. No.: 13/257,662

(22) PCT Filed: Dec. 17, 2010

(86) PCT No.: PCT/CN2010/079954
§ 371 (c)(1),
(2), (4) Date: Sep. 20, 2011

(87) PCT Pub. No.: WO2011/097923
PCT Pub. Date: Aug. 18, 2011

(65) Prior Publication Data
US 2012/0300670 A1    Nov. 29, 2012

(30) Foreign Application Priority Data

Feb. 12, 2010   (CN) .......................... 2010 1 0114494

(51) Int. Cl.
*H04W 72/04*    (2009.01)
*H04W 4/00*    (2009.01)
(Continued)

(52) U.S. Cl.
CPC ............ *H04L 5/0023* (2013.01); *H04L 5/0051* (2013.01); *H04L 25/0204* (2013.01); *H04L 25/0226* (2013.01); *H04L 2025/03414* (2013.01); *H04L 2025/03426* (2013.01)
USPC .......... 370/329; 370/328; 370/335; 370/252; 455/450; 455/452.1; 455/509

(58) Field of Classification Search
CPC ... H04L 5/0048; H04L 5/0023; H04L 5/0051; H04L 5/0094; H04L 5/0053; H04L 5/0007; H04L 2025/03426; H04L 5/026; H04L 5/0035; H04L 5/0037; H04L 5/3358; H04L 25/03898

USPC ................. 370/479–480, 329, 328, 335, 252; 455/450, 452.1, 509
See application file for complete search history.

(56) References Cited

U.S. PATENT DOCUMENTS 8,498,254 B2 *  7/2013  Dai et al. ...................... 370/329
8,537,766 B2 *  9/2013  Hu et al. ....................... 370/329
(Continued)

FOREIGN PATENT DOCUMENTS

CN          101645868 A     2/2010
KR      20090049972 A      5/2009
(Continued)

OTHER PUBLICATIONS

3GPP TSG-RAN WG1 #59bis R1-100050, Layer-to-DMRS port mapping for LTE-Advanced, Jan. 22, 2010 sections 2,3, figures 4,5,7.
(Continued)

*Primary Examiner* — Asad Nawaz
*Assistant Examiner* — Wutchung Chu
(74) *Attorney, Agent, or Firm* — Ling Wu; Stephen Yang; Ling and Yang Intellectual Property

(57) ABSTRACT

Disclosed in the present invention is a pre-coding method for hybrid multiplexing demodulation reference symbol (DMRS). The method includes: determining a multiplexing relationship between DMRS ports; making layers of data transport correspond to DMRS ports with the multiplexing relationship determined; and pre-coding pilot sequences corresponding to various DMRS ports according to the relationship between the layers of data transport and the DMRS ports. Also disclosed in the present invention is a method for mapping from a layer to a multiplexing demodulation reference symbol (DMRS) and an apparatus for achieving pre-coding based on a hybrid multiplexing demodulation reference symbol (DMRS). By way of the technical solution of the present invention, interference between the layers corresponding to different codeword streams can be avoided, and the accuracy of channel estimation can be improved.

15 Claims, 3 Drawing Sheets

(51) Int. Cl.
*H04L 12/26* (2006.01)
*H04W 52/14* (2009.01)
*H04L 5/00* (2006.01)
*H04L 25/02* (2006.01)
*H04L 25/03* (2006.01)

(56) References Cited

U.S. PATENT DOCUMENTS

| | | | |
|---|---|---|---|
| 2010/0002800 A1* | 1/2010 | Kim et al. | 375/295 |
| 2010/0034312 A1* | 2/2010 | Muharemovic et al. | 375/267 |
| 2010/0196615 A1* | 8/2010 | Torigoe et al. | 427/456 |
| 2011/0051749 A1* | 3/2011 | Cheng et al. | 370/480 |
| 2011/0051824 A1* | 3/2011 | Kim et al. | 375/259 |
| 2011/0170562 A1* | 7/2011 | Hu et al. | 370/479 |
| 2011/0194536 A1* | 8/2011 | Kim et al. | 370/335 |
| 2012/0033643 A1* | 2/2012 | Noh et al. | 370/335 |
| 2012/0039287 A1* | 2/2012 | Ko et al. | 370/329 |
| 2012/0106473 A1* | 5/2012 | Tiirola et al. | 370/329 |
| 2012/0113934 A1* | 5/2012 | Ko et al. | 370/329 |
| 2012/0213147 A1* | 8/2012 | Noh et al. | 370/315 |
| 2012/0224555 A1* | 9/2012 | Lee et al. | 370/329 |
| 2012/0300728 A1* | 11/2012 | Lee et al. | 370/329 |
| 2013/0021991 A1* | 1/2013 | Ko et al. | 370/329 |
| 2013/0301554 A1* | 11/2013 | Nam et al. | 370/329 |

FOREIGN PATENT DOCUMENTS

| | | |
|---|---|---|
| WO | 2009099306 A1 | 8/2009 |
| WO | WO 2011085510 A1 * | 7/2011 |

OTHER PUBLICATIONS

3GPP TSG RAN WG1 Meeting #58bis R1-094510, Further views on downlink multi-user MIMO operation for LTE-Advanced, Nov. 13, 2009, pp. 1-3.

International Search Report for PCT/CN2010/079954 dated Mar. 8, 2011.

"Layer-to-DM RS port mapping for LTE-Advanced"; Ericsson, ST-Ericsson; 7.2.3.3, Discussion and Decision; 3GPP TSG-RAN WG1 #59bis, Valencia, Spain, Jan. 18-22, 2010; R1-100050; see pp. 2-6/E.

"Discussion on Layer to DMRS mapping"; 7.2.3.3, Samsung, Discussion and decision; 3GPP TSG RAN WG1 #59bis, Valencia, Spain, Jan. 18-22, 2010; R1-100112; see pp. 2-4/E.

* cited by examiner

Normal subframe

A subframe where DwPTS occupies 11 or 12 OFDM symbols

PRE-CODING METHOD AND APPARATUS BASED ON MIXED MULTIPLEXING DEMODULATION REFERENCE SIGNALS

TECHNICAL FIELD

The present invention relates to the long term evolution advanced (LTE-A) technology, and in particular, to a pre-coding method and apparatus based on a hybrid multiplexing demodulation reference symbol.

BACKGROUND OF THE RELATED ART

The high order multi-antenna technology is one of the critical technologies of the long term evolution advanced (LTE-A or LTE-Advanced) system for improving the transmission rate of the system. In order to achieve channel quality measurement and data demodulation after the high order multi-antenna technology is introduced, the LTE-Advanced system respectively defines two types of pilot symbols: demodulation reference symbol (DMRS) and channel quality measurement-reference symbol (CSI-RS), wherein the demodulation reference symbol is a reference symbol used for the demodulation of a physical downlink shared channel (PDSCH). The measurement reference symbol is a reference symbol used for measuring channel state information (CSI) and also for reporting information such as channel quality indicatior (CQI), pre-coding matrix indicator (PMI), and rank indicator (RI). The structures of the above two types of reference symbols can be used for supporting new technologies of LTE-A such as coordinated multi-point (CoMP), spatial multiplexing, etc.

In the LTE, a common reference signal (or cell-specific reference signal, CRS) is used for pilot measurement, that is, all the users use the common pilot to carry out channel estimation. Such common reference signal requires the transmission side to notify the receiving end which preprocessing manner is used on the transmitted data, and also the overhead is considerable; furthermore, in a multi-user multi-input multi-output (MU-MIMO) system, since a plurality of user equipment (UE) use the same CRS, the orthogonality of pilots cannot be realized, and the interference cannot be estimated.

In the LTE-A, in order to reduce the pilot overhead, the channel quality measurement reference symbol and demodulation reference symbol are designed separately, and the demodulation reference signal and data employ the same pre-processing manner. At the same time, the demodulation reference symbol is mapped according to the available rank information of the corresponding channel of a scheduling user, therefore, the overhead can be adjusted in a self-adaptive way according to the rank information so that the overhead can be greatly reduced in the case where the rank is relatively low.

In the current discussion, the design pattern of the demodulation reference symbol has already been determined, as shown in FIGS. 1(a), 1(b) and 1(c), when the rank used by downlink transmission is less than or equal to 2, the resource unit indicated by ▨ is merely used for the transmission of DMRS and the scrambling is carried out on two adjacent Orthogonal Frequency Division Multiplexing (OFDM) symbols in time domain by using an orthogonal cover code (OCC) with the length thereof being 2. The ▩ in FIGS. 1(a), 1(b) and 1(c) represents common reference signal (CRS).

When the rank is greater than or equal to 3 and less than or equal to 4, two groups of resource units (RE) are used, respectively shown as ▨ and ▨. In this case, orthogonal code division multiplexing (CDM) can be carried out on 2 layers of DMRS at most on each group of RE, and each group of RE carries out orthogonal scrambling on two adjacent OFDM symbols in time domain by using an orthogonal cover code with the length thereof being 2. When the rank is greater than 4, for two groups of RE (as shown by ▨ and ▨ ), each group carries out orthogonal scrambling in the direction of time domain by using an OCC code with the length thereof being 4 and the maximum number of orthogonal CDM multiplexing DMRS layers is 4 in each group of RE.

In addition, currently in the case of single-user multi-input multi-output (SU-MIMO), the mapping manner from codeword stream to layer defines the situation of different numbers of layers, as shown in FIG. 2.

In LTE-A, in order to support 8-layer transmission at most, it needs to at most define 8 DMRS ports, indicated as DMRS port 7, 8, 9, 10, 11, 12, 13 and 14. In this case, the DMRS port is an antenna port defined on layer, corresponding to the layer of data transport, and it is used for estimating the equivalent channel of the data of each layer during space transmission.

However, when the UE side carries out data demodulation, in order to be able to carry out demodulation, it is necessary to determine that the DMRS corresponding to which DMRS ports occupies the same group of resources, and to carry out code division multiplexing, and use the relationship between the data layer and the demodulation reference symbol port, so as to estimate the channel information of the corresponding layer and carry out the detection.

SUMMARY OF THE INVENTION

Based on the DMRS pattern of the subframe defined in the related art, how to map the demodulation reference symbol of the layer corresponding to each codeword stream and map the same to which RE groups are problems to be designed and taken into account. Good allocation manner is advantageous for improving system performance and at the same time reducing signaling overhead, therefore, it is necessary to propose a mapping manner so as to reduce the probability of random mapping and reduce signaling overhead.

The technical problem to be solved by the present invention is to provide pre-coding method and apparatus based on a hybrid multiplexing demodulation reference symbol, so as to avoid interference between the layers corresponding to different codeword streams.

In order to solve the above technical problem, disclosed in the present invention is a pre-coding method for a hybrid multiplexing demodulation reference symbol (DMRS), and the method comprises:

determining a multiplexing relationship between DMRS ports;

making layers of data transport respectively correspond to DMRS ports with the multiplexing relationship determined; and pre-coding pilot sequences corresponding to various DMRS ports according to a relationship between the layers of data transport and the DMRS ports.

Determining a multiplexing relationship between DMRS ports refers to:

classifying DMRS ports 7, 8, 11 and 13 as one DMRS port group, classifying DMRS ports 9, 10, 12 and 14 as another DMRS port group, wherein various DMRS ports in the classified DMRS port groups employ a code division multiplexing manner, and different DMRS port groups employ a time division and/or frequency division multiplexing manner.

Making layers of data transport respectively correspond to DMRS ports with the multiplexing relationship determined refers to making the layers correspond to the DMRS ports according to any one or a combination of a plurality of conditions as follows:

making all the layers of data transport uniformly correspond to the DMRS ports in these two classified DMRS port groups; and making all the layers correspond to the DMRS ports in these two classified DMRS port groups according to the relationship between each codeword stream and the layer of data transport.

Making all the layers correspond to the DMRS ports in these two classified DMRS port groups according to the relationship between each codeword stream and the layer of data transport comprises:

making layers of same codeword stream correspond to the DMRS ports of same DMRS port group with priority, and making layers of different codeword streams correspond to the DMRS ports of different DMRS port groups respectively; or making the layers of the same codeword stream correspond to the DMRS ports of different DMRS port groups with priority, and making the layers of different codeword streams correspond to the DMRS ports of the same DMRS port group.

In the step of making layers of same codeword stream correspond to the DMRS ports of same DMRS port group with priority and making the layers of different codeword streams correspond to the DMRS ports of different DMRS port groups respectively, when the total number M of the layers corresponding to the same codeword stream is greater than the maximum number N of ports supported by one DMRS port group, making N layers in all the layers corresponding to the same codeword stream correspond to the DMRS ports in the same DMRS port group with priority, then making the remaining M-N layers correspond to the DMRS ports in different DMRS port groups; or making N layers in all the layers corresponding to the same codeword stream correspond to the DMRS ports in the different DMRS port groups with priority, then making the remaining M-N layers correspond to the DMRS ports in the same DMRS port group.

Making the layers of the same codeword stream correspond to the DMRS ports in the same DMRS port group with priority, and making the layers of different codeword streams correspond to the DMRS ports in different DMRS port groups respectively, when all the layers correspond to two codeword streams, making the layers corresponding to one codeword stream therein correspond to the DMRS ports in one DMRS port group, and making the layers corresponding to the other codeword stream therein correspond to the DMRS ports in another DMRS port group.

Making layers of data transport respectively correspond to DMRS ports with the multiplexing relationship determined refers to:

configuring one-to-one fixed mapping relationships according to sequence numbers of the layer and DMRS port.

The method further comprises:

when the method is used in a MU-MIMO system, taking the layers corresponding to the same multiplexing user as the layers corresponding to the same codeword stream to carry out mapping from layer to DMRS port.

The method further comprises:

ranking various multiplexing users from high to low according to the total number of layers corresponding to various multiplexing users, and allocating DMRS ports to the layers corresponding to each multiplexing user successively according to rank locations.

In order to solve the above technical problem, also disclosed in the present invention is an apparatus for mapping from a layer to a multiplexing demodulation reference symbol (DMRS) port, applied in a pre-coding method based on a hybrid multiplexing DMRS, wherein the mapping method comprises:

determining a multiplexing relationship between DMRS ports; and making layers of data transport respectively correspond to DMRS ports with the multiplexing relationship determined.

The step of determining a multiplexing relationship between DMRS ports comprises:

classifying DMRS ports 7, 8, 11 and 13 as one DMRS port group, classifying DMRS ports 9, 10, 12 and 14 as another DMRS port group, wherein various DMRS ports in the classified DMRS port groups employ a code division multiplexing manner, and different DMRS port groups employ a time division and/or frequency division multiplexing manner.

In the step of making layers of data transport respectively correspond to DMRS ports with the multiplexing relationship determined, the layers are made to correspond to the DMRS ports according to any one or a combination of a plurality of conditions as follows:

making all the layers of data transport uniformly correspond to the DMRS ports in these two classified DMRS port groups; and making all the layers correspond to the DMRS ports in these two classified DMRS port groups according to a relationship between each codeword stream and the layer of data transport.

Making all the layers correspond to the DMRS ports in two classified DMRS port groups according to the relationship between each codeword stream and the layer of data transport comprises:

making the layers of same codeword stream correspond to the DMRS ports in the same DMRS port group with priority, and making the layers of different codeword streams correspond to the DMRS ports in different DMRS port groups respectively; or making the layers of the same codeword stream correspond to the DMRS ports in different DMRS port groups with priority, and making the layers of different codeword streams correspond to the DMRS ports in the same DMRS port group.

The step of making the layers correspond to the DMRS ports further comprises:

when the total number M of the layers corresponding to the same codeword stream is greater than the maximum number N of ports supported by one DMRS port group, making N layers in all the layers corresponding to the same codeword stream correspond to the DMRS ports in the same DMRS port group with priority, then making the remaining M-N layers correspond to the DMRS ports in different DMRS port groups; or making N layers in all the layers corresponding to the same codeword stream correspond to the DMRS ports in the different DMRS port groups with priority, then making the remaining M-N layers correspond to the DMRS ports in the same DMRS port group.

The step of making the layers correspond to the DMRS ports further comprises: when all the layers correspond to two codeword streams, making the layers corresponding to one codeword stream therein correspond to the DMRS ports in one DMRS port group, and making the layers corresponding to the other codeword stream therein correspond to the DMRS ports in another DMRS port group.

The step of making layers of data transport respectively correspond to DMRS ports with the multiplexing relationship determined comprises:

configuring one-to-one fixed mapping relationships according to sequence number of the layers and DMRS ports.

The method further comprises:

when the method is used in a MU-MIMO system, taking the layers corresponding to the same multiplexing user as the layers corresponding to the same codeword stream to carry out mapping from layer to DMRS port.

The method further comprises:

ranking various multiplexing users from high to low according to the total number of layers corresponding to various multiplexing users, and allocating DMRS ports to the layers corresponding to each multiplexing user successively according to rank locations.

In order to solve the above technical problem, disclosed in the present invention is an apparatus for achieving pre-coding based on a hybrid multiplexing demodulation reference symbol (DMRS), comprising a mapping module and a pre-coding module, wherein the mapping module is configured to: determine a multiplexing relationship between DMRS ports and make layers of data transport respectively correspond to various DMRS ports with the multiplexing relationship determined; and the pre-coding module is configured to: pre-code pilot sequences corresponding to various DMRS ports according to a relationship between the layers of data transport and the DMRS ports.

The mapping module is configured to determine a multiplexing relationship between DMRS ports according to the following manner: classifying DMRS ports 7, 8, 11 and 13 as one DMRS port group, classifying DMRS ports 9, 10, 12 and 14 as another DMRS port group, wherein various DMRS ports in two classified DMRS port groups employ a code division multiplexing manner, and different DMRS port groups employ a time division and/or frequency division multiplexing manner.

The mapping module is configured to make layers of data transport respectively correspond to various DMRS ports with the multiplexing relationship determined according to any one or a combination of two conditions as follows:

making all the layers of data transport uniformly correspond to the DMRS ports in two classified DMRS port groups; and making all the layers correspond to the DMRS ports in two classified DMRS port groups according to a relationship between each codeword stream and the layer of data transport;

wherein making all the layers correspond to the DMRS ports in these two classified DMRS port groups according to the relationship between each codeword stream and the layer of data transport comprises:

making the layers of same codeword stream correspond to the DMRS ports in the same DMRS port group with priority, and making the layers of different codeword streams correspond to the DMRS ports in different DMRS port groups respectively; or making the layers of the same codeword stream correspond to the DMRS ports in different DMRS port groups with priority, and making the layers of different codeword streams correspond to the DMRS ports in the same DMRS port group.

The mapping module is further configured to make the layers correspond to the DMRS ports according to the following manner:

when the total number M of the layers corresponding to the same codeword stream is greater than the maximum number N of ports supported by a DMRS port group, making N layers in all the layers corresponding to the same codeword stream correspond to the DMRS ports in the same DMRS port group with priority, then making the remaining M-N layers correspond to the DMRS ports in different DMRS port groups; or making N layers in all the layers corresponding to the same codeword stream correspond to the DMRS ports in the different DMRS port groups with priority, then making the remaining M-N layers correspond to the DMRS ports in the same DMRS port group;

when all the DMRS layers correspond to two codeword streams, making the DMRS layers corresponding to one codeword stream therein correspond to the DMRS ports in one DMRS port group, and making the DMRS layers corresponding to the other codeword stream therein correspond to the DMRS ports in another DMRS port group.

When the apparatus is applied in a MU-MIMO system, the mapping module is further configured to rank various multiplexing users from high to low according to the total number of layers corresponding to various multiplexing users, and allocate DMRS ports to the layers corresponding to each multiplexing user successively according to rank locations.

By way of the technical solution of the present invention, interference between the layers corresponding to different codeword streams can be avoided, and the accuracy of channel estimation can be improved. At the same time, since the technical solution of the present invention employs a fixed mapping manner, the probability of random mapping is reduced and the overhead of the control signaling is also reduced.

PREFERRED EMBODIMENTS OF THE PRESENT INVENTION

Figure 1A:
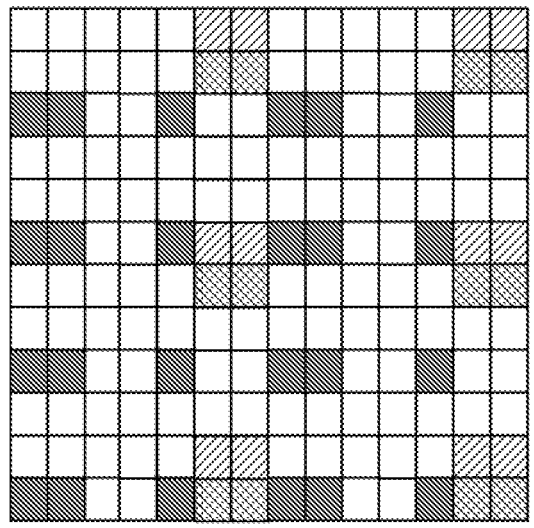
FIG. 1(a) is a DMRS pattern of a normal subframe in the LTE-A.

Hereinafter, the technical solution of the present invention will be described in detail in conjunction with the accompanying drawings and particular embodiments. It needs to be noted that the embodiments of the present application and the features in the embodiments can be combined with each other if there is no conflict.

An apparatus for implementing pre-coding based on a hybrid multiplexing demodulation reference symbol comprises a mapping module and a pre-coding module, wherein the mapping module is configured to: determine a relationship between various DMRS ports and the RE in the DMRS pattern, and make layers of data transport respectively correspond to various DMRS ports with the multiplexing relationship determined; and in this embodiment, the mapping module classifies DMRS ports 7, 8, 11 and 13 as one DMRS port group, classifies DMRS ports 9, 10, 12 and 14 as another DMRS port group, wherein various DMRS ports in two classified DMRS port groups employ a code division multiplexing manner, and different DMRS port groups employ a time division and/or frequency division multiplexing manner;

the mapping module can be configured to make layers of data transport respectively correspond to various DMRS ports with the multiplexing relationship determined according to any one or a combination of a plurality of conditions as follows:

A) making all the layers of data transport uniformly correspond to the DMRS ports in these two classified DMRS port groups; and B) making all the layers correspond to the DMRS ports in these two classified DMRS port groups according to the relationship between each codeword stream and the layer of data transport;

wherein making all the layers correspond to the DMRS ports in these two classified DMRS port groups according to the relationship between each codeword stream and the layer of data transport refers to:

making the layers of same codeword stream correspond to the DMRS ports in the same DMRS port group with priority, and making the layers of different codeword streams correspond to the DMRS ports in different DMRS port groups respectively; or making the layers of the same codeword stream correspond to the DMRS ports in different DMRS port groups with priority, and making the layers of different codeword streams correspond to the DMRS ports in the same DMRS port group.

When the total number M of the layers corresponding to the same codeword stream is greater than the maximum number N of ports supported by a DMRS port group, the mapping module makes N layers in all the layers corresponding to the same codeword stream correspond to the DMRS ports in the same DMRS port group with priority, then makes the remaining M-N layers correspond to the DMRS ports in different DMRS port groups; or it makes N layers in all the layers corresponding to the same codeword stream correspond to the DMRS ports in the different DMRS port groups with priority, then makes the remaining M-N layers correspond to the DMRS ports in the same DMRS port group.

When all the DMRS layers correspond to two codeword streams, the mapping module can make the DMRS layers corresponding to one codeword stream therein correspond to the DMRS ports in one DMRS port group, and it can make the DMRS layers corresponding to the other codeword stream therein correspond to the DMRS ports in another DMRS port group.

The mapping module can also be configured to set a fixed relationship between the layers of data transport and the DMRS ports.

The pre-coding module is configured to: pre-code pilot sequences corresponding to various DMRS ports according to the relationship between the layers of data transport and the DMRS ports.

The above apparatus can be applied in a MU-MIMO system, at this moment, the mapping module can take the layers corresponding to the same multiplexing user as the layers corresponding to the same codeword stream to carry out mapping from layer to DMRS port, in particular, the mapping module rank various multiplexing users from high to low according to the total number of layers corresponding to various multiplexing users, and allocating DMRS ports to the layers corresponding to each multiplexing user successively according to the rank locations.

Figure 1B:
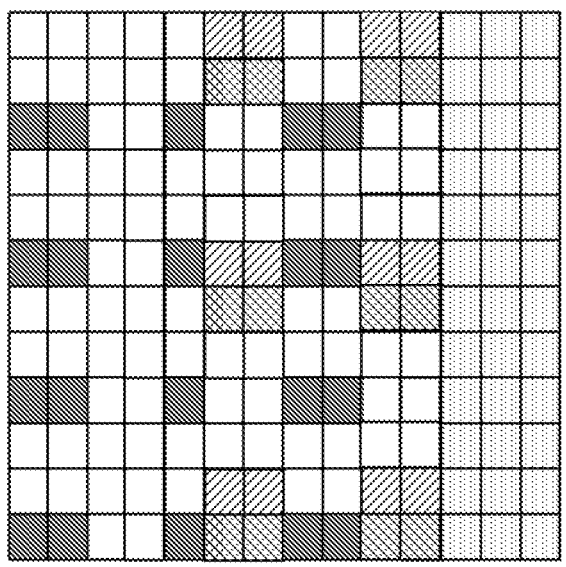
FIG. 1(b) is a DMRS pattern of a subframe in which a downlink pilot timeslot occupies 11 or 12 OFDM symbols in the LTE-A.
Figure 1C:
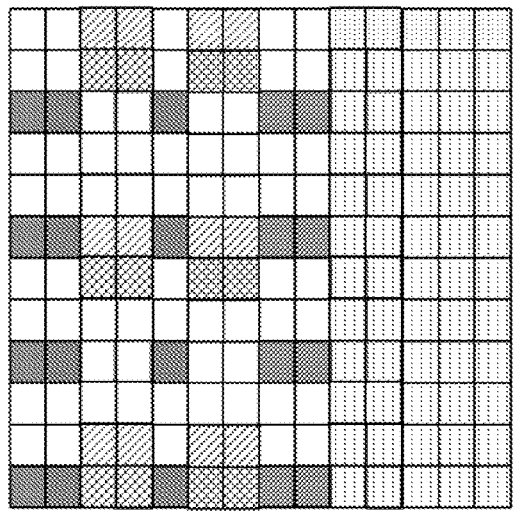
FIG. 1(c) is a DMRS pattern of a subframe in which a downlink pilot timeslot occupies 9 or 10 OFDM symbols in the LTE-A.
Figure 2:
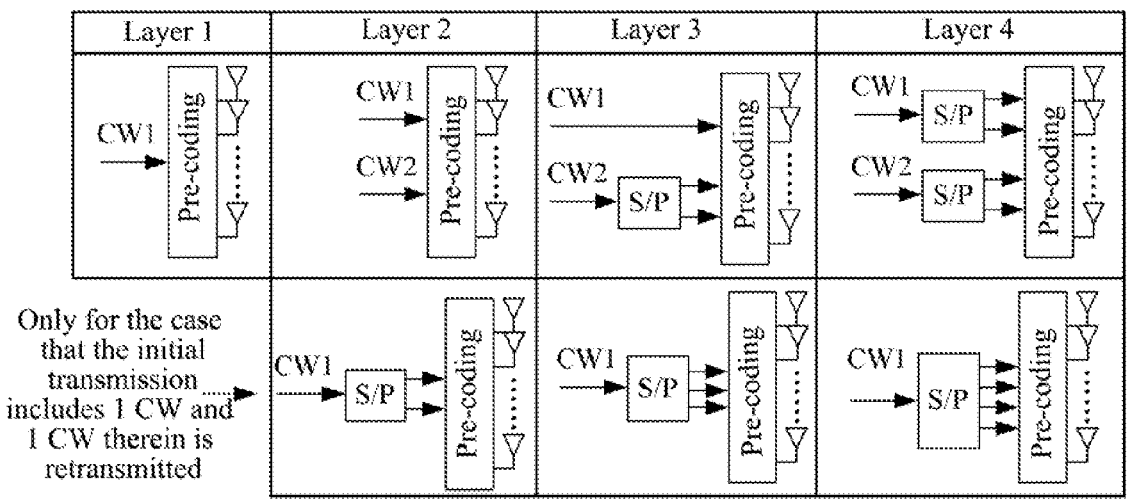
FIG. 2 is a schematic diagram of a mapping relationship from codeword stream to layer in the SU-MIMO mode.
Figure 2:
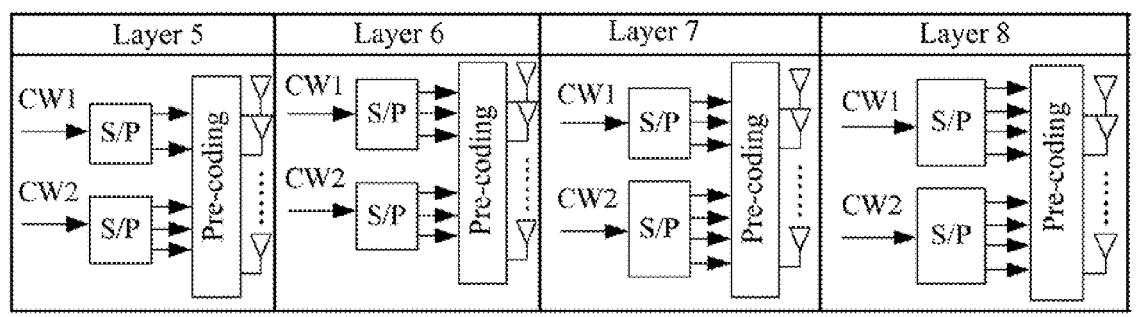
Figure 3:
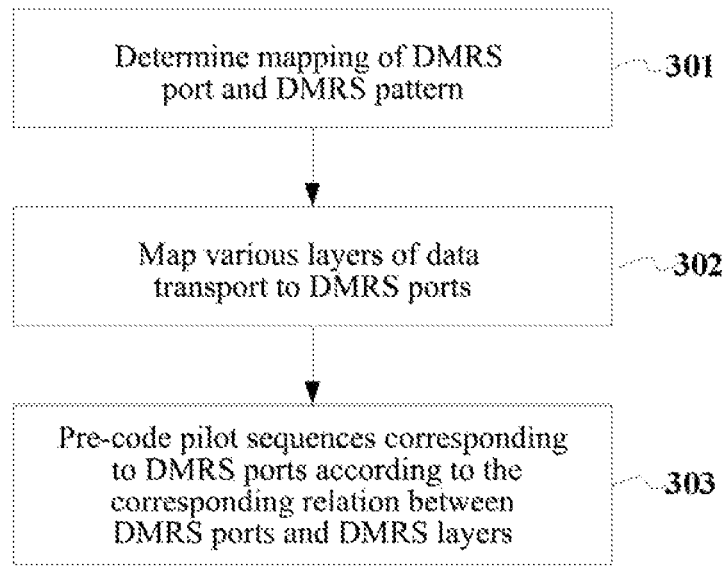
FIG. 3 is a schematic diagram of the procedure of pre-coding proposed in the present invention.
Figure 4:
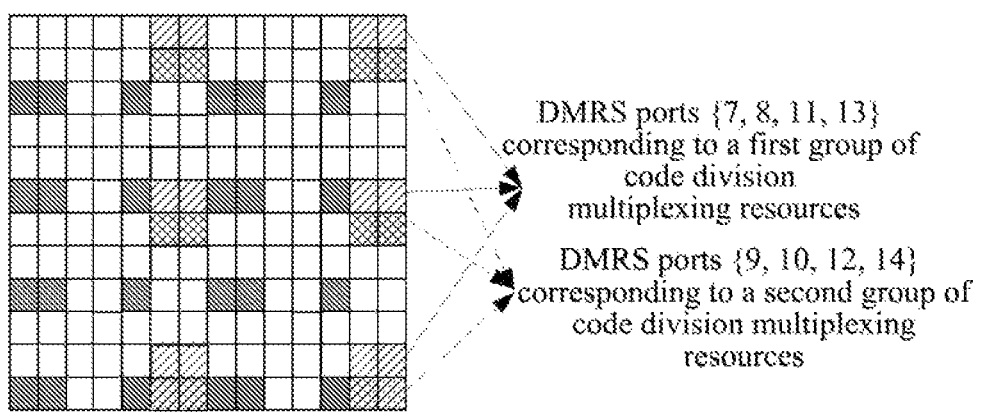
FIG. 4 is a schematic diagram of multiplexing relationship configuration of a DMRS port in this embodiment.

Hereinafter, the process of the above apparatus achieving pre-coding based on a hybrid multiplexing DMRS is introduced, and this process is as shown in FIG. 3, including the following steps:

Step 301: a mapping between a DMRS port and a resource unit in a DMRS pattern is determined;

in this step, determining the mapping between DMRS port and DMRS pattern is actually to determine the pilots of which DMRS ports that the code division multiplexing is performed on and which ports the frequency division multiplexing is performed on, and the particular operation is to classify the DMRS ports as two DMRS port groups, various DMRS ports in the same DMRS port group employ the code division multiplexing manner, and the time division and/or frequency division multiplexing (FDM/TDM) is carried out between the DMRS port groups;

in this embodiment, the DMRS ports are classified as two groups, and the first DMRS port group includes DMRS ports {7, 8, 11, 13}, and the demodulation reference symbol of that DMRS port group can be mapped to resources shown by  in FIGS. 1(a), 1(b) and 1(c) and carry out code division multiplexing; the second DMRS port group includes DMRS ports {9, 10, 12, 14}, and that DMRS port group corresponds to resources shown by  in FIGS. 1(a), 1(b) and 1(c) and carries out code division multiplexing. Time division and/or frequency division multiplexing is carried out between these two DMRS port groups. Taking a normal subframe with normal cyclic prefix (N-CP) as an example, the mapping relationship between DMRS port and DMRS pattern is as shown in FIG. 4.

Step 302: the layers of data transport is mapped to the DMRS ports;

in this step, in order to enable the user equipment to detect the data with the channels corresponding to various layers, it is necessary to determine the relationship between layer and DMRS port, and the particular corresponding principle follows any one or two of the following principles:

A) making all the layers of data transport uniformly correspond to the DMRS ports in these two classified DMRS port groups; and B) making each layer correspond to the DMRS port of the DMRS port group according to the relationship between the codeword stream and layer.

In this case, carrying out a corresponding operation according to the relationship between codeword stream and layer refers to:

mapping the layers of the same codeword stream to the DMRS ports carrying out code division multiplexing with priority (i.e. mapping the layers of the same codeword stream to the DMRS ports in the same DMRS port group with priority), and mapping the layers of different codeword streams to the DMRS ports corresponding to different code division multiplexing groups respectively (i.e. mapping the layers of different codeword streams to the DMRS ports in different DMRS port groups respectively); or mapping the layers of the same codeword stream to DMRS ports carrying out frequency division and/or time division multiplexing with priority (i.e. mapping the layers of the same codeword stream to the DMRS ports in different DMRS port groups with priority), and mapping the layers of different codeword streams to the DMRS ports carrying out code division multiplexing respectively (i.e. mapping the layers of different codeword streams to the DMRS ports in one DMRS port group).

During the above mapping operation, if the total number M of the layers corresponding to one codeword stream is greater than the maximum number N of ports supported by the DMRS port group carrying out code division multiplexing (i.e. the maximum number of orthogonal CDM layers supported by each RE), then N layers in all the layers corresponding to the codeword stream are mapped on the DMRS ports in one DMRS port group with priority (i.e. make these N layers correspond to the DMRS ports in one DMRS port group), and map the remaining M-N layers to the DMRS ports in another DMRS port group.

As to two codeword streams, the layers corresponding to the codeword stream with more layers can be mapped to the DMRS ports in one DMRS port group, and the layers corresponding to the codeword stream with fewer layers can be mapped to the available DMRS ports in another DMRS port group.

When determining the relationship from layer to DMRS port, a fixed relationship can also be set between layer of data transport and DMRS port;

for example, DMRS ports $\{p_0, p_1, p_2, p_3, p_4, p_5, p_6, p_7\}$ are defined. Wherein, when the number of layers of data transport is less than or equal to 2, the relationship between layer and DMRS port can be set as:

layer0 ↔ port0
layer1 ↔ port1 when the number of layers is greater than 2 and less than or equal to 4, the relationship between layer and DMRS port can be set as:

layer0 ↔ port0
layer1 ↔ port1
layer2 ↔ port2
layer3 ↔ port3 when the number of layers is greater than 4 and less than or equal to 8, the relationship between layer and DMRS port can be set as:

layer0 ↔ port0
layer1 ↔ port1
layer2 ↔ port2
layer3 ↔ port3
layer4 ↔ port4
layer5 ↔ port5
layer6 ↔ port6
layer7 ↔ port7

In this case, in the LTE-A, $\{p_0, p_1, p_2, p_3, p_4, p_5, p_6, p_7\}$ are DMRS ports 7, 8, 9, 10, 11, 12, 13 and 14 respectively.

Step 303: the pre-coding is carried out on pilot sequences corresponding to DMRS ports according to the relationship between the DMRS ports and DMRS layers;

during particular implementation, since the pre-coding vector used when carrying out pre-coding on the DMRS resource units is the same as that used when carrying out pre-coding on data resource units, the pre-coding vector corresponding to each layer corresponds to the pre-coding vector used by the DMRS corresponding to this layer. Since the same codeword stream uses the same modulation encoding manner, when carrying out layer allocation, consecutive layers are allocated preferably to the same codeword stream.

The data pre-coding form can be represented in the form of formula (1)

$$\begin{bmatrix} x_0 \\ x_1 \\ M \\ x_P \end{bmatrix} = [w_0, w_1, L, w_L] \begin{bmatrix} s_0 \\ s_1 \\ M \\ s_L \end{bmatrix}, \quad (1)$$

where $w_i$ represents the pre-coding vector corresponding to layer i and is a P*1 column vector, P represents the number of physical antennae; $s_i$ represents the data of layer i and is a $1*N_{layer}$ row vector, wherein $N_{layer}$ represents the length of the data of each layer, and L represents the number of layers.

Since the RE corresponding to DMRS employs the same pre-coding weight processing with the data, the DMRS resource units of the DMRS antenna ports corresponding to layer will employ a weight corresponding to the layer.

Also proposed in the present invention is a method for mapping from layer to DMRS port based on hybrid multiplexing DMRS, and that method is a particular implementation method of the operations of steps 301 and 302 in the above pre-coding method.

Hereinafter, the particular implementation of mapping from layer to DMRS port will be descried in conjunction with particular application scenarios.

Embodiment 1

This embodiment takes a SU-MIMO system as an example to describe the mapping manner from the layer of codeword stream to DMRS port. In the SU-MIMO, when the total number of layers corresponding to each codeword stream is less than or equal to the number of orthogonal code division multiplexing layers supported by the RE corresponding to each group of CDM multiplexing DMRS ports (i.e. the maximum number of ports supported in the DMRS port group), the mapping manner is as follows:

the DMRS ports of each layer corresponding to the same codeword stream employ the same multiplexing manner (i.e. the layers corresponding to the same codeword stream are mapped to the DMRS ports of the same DMRS group), such as code division multiplexing manner; the same or different multiplexing manner is used between the DMRS ports of the layers corresponding to different codeword streams (i.e. the layers corresponding to different codeword streams are mapped to the DMRS ports of different DMRS port groups or correspond to the DMRS ports in the same DMRS port group), such as frequency division multiplexing or code division multiplexing manner.

In particular, each layer corresponding to the same codeword stream is mapped to one group of DMRS ports utilizing CDM multiplexing, such as RE location shown by ▨ or RE location shown by ▨ in FIG. 1. Each layer corresponding to different codeword streams is mapped to the DMRS ports of different CDM groups.

That is to say, the DMRS port of each layer corresponding to the same codeword stream employs FDM/TDM multiplexing manner (i.e. make the layers corresponding to the same codeword stream correspond to the DMRS ports of different DMRS port group), and the DMRS ports of each layer corresponding to different codeword streams employ the multiplexing manner of the CDM group with priority (i.e. map the layers corresponding to different codeword streams to the DMRS ports in the same DMRS port group).

When the total number M of layers corresponding to a certain codeword stream is greater than the number N of orthogonal code division multiplexing ports supported by each group of CDM multiplexing REs, the mapping method is: multiplexing the layers corresponding to the same codeword stream according to the same multiplexing manner with priority (i.e. first map N layers of the number of ports at most supported by one group on the DMRS ports of one DMRS port group), and as to the remaining layers in the same codeword stream, they can be multiplexed according to different multiplexing manners (i.e. the remaining (M-N) layers are made to correspond to the DMRS ports of another DMRS port group).

Taking 2 codeword streams as an example, assuming when rank1-2, the corresponding DMRS ports are $p_0$ and $p_1$, and the DMRSs corresponding to $p_0$ and $p_1$ are multiplexed in the manner of code division; when rank3-4, the corresponding DMRS ports are $\{p_0, p_1, p_2, p_3\}$ and code division multiplexing is carried out on $p_0$ and $p_1$, corresponding to RE shown by ▨ in FIGS. 1(a), 1(b) and 1(c), and OCC code multiplexing with the length thereof being 2 is used in the direction of time domain; and code division multiplexing is carried out on $p_2$ and $p_3$, corresponding to RE shown by ▨ in FIG. 1, and OCC code multiplexing with the length thereof being 2 is used in the direction of time domain. When rank5-8, the corresponding DMRS ports are $\{p_0, p_1, p_2, p_3, p_4, p_5, p_6, p_7\}$ and code division multiplexing is carried out on the DMRSs corresponding to $p_0$, $p_1$, $p_4$ and $p_6$, corresponding to RE shown by ▨ in FIGS. 1(a), 1(b) and 1(c), and OCC code multiplexing with the length thereof being 4 is used in the direction of time domain; code division multiplexing is carried out on the DMRSs corresponding to $p_2$, $p_3$, $p_5$ and $p_7$, corresponding to RE shown by ▨ in FIG. 1, and OCC code multiplexing with the length thereof being 4 is used in the direction of time domain.

When the DMRS corresponding to each layer of the same codeword stream employs CDM with priority and the DMRS corresponding to each layer of different codeword streams employs FDM/TDM with priority, in the case of different numbers of layers, the mapping manner from each layer corresponding to a codeword stream to a DMRS port is as shown in Table 1-1, and CWi represents the ith codeword stream in the table.

TABLE 1-1

Mapping manner from each layer corresponding to a codeword stream to a DMRS port in the case of different numbers of layers

| Index | Number of layers | Number of codeword streams | Mapping from codeword stream to layer | Mapping manner from DMRS of each layer of codeword stream to DMRS port |
|---|---|---|---|---|
| 1 | 1 | 1 | CW0 ↔ layer0 | layer0 ↔ $p_0$ |
| 2 | 2 | 1 | CW0 ↔ {layer0, layer1} | {layer0 ↔ $p_0$, layer1 ↔ $p_1$} |
| 3 | 2 | 2 | CW0 ↔ layer0; CW1 ↔ layer1 | {layer0 ↔ $p_0$, layer1 ↔ $p_1$} |
| 4 | 3 | 2 | CW0 ↔ layer0; CW1 ↔ {layer1, layer2} | {layer0 ↔ $p_0$, layer1 ↔ $p_2$, layer2 ↔ $p_3$} performing CDM on DMRS } FDM  Or  {layer0 ↔ $p_2$, layer1 ↔ $p_0$, layer2 ↔ $p_1$} performing CDM on DMRS } FDM |
| 5 | 4 | 2 | CW0 ↔ {layer0, layer1}; CW1 ↔ {layer2, layer3} | {layer0 ↔ $p_0$, layer1 ↔ $p_1$} performing CDM on DMRS; {layer2 ↔ $p_2$, layer3 ↔ $p_3$} performing CDM on DMRS } FDM  Or  {layer0 ↔ $p_2$, layer1 ↔ $p_3$} performing CDM on DMRS; {layer2 ↔ $p_0$, layer3 ↔ $p_1$} performing CDM on DMRS } FDM |

TABLE 1-1-continued

Mapping manner from each layer corresponding to a codeword stream to a
DMRS port in the case of different numbers of layers

| Index | Number of layers | Number of codeword streams | Mapping from codeword stream to layer | Mapping manner from DMRS of each layer of codeword stream to DMRS port |
|---|---|---|---|---|
| 6 | 5 | 2 | $CW0 \leftrightarrow \begin{cases} layer0 \\ layer1 \end{cases}$ $CW1 \leftrightarrow \begin{cases} layer2 \\ layer3 \\ layer4 \end{cases}$ | $\begin{cases} \left.\begin{matrix} layer0 \leftrightarrow p_0 \\ layer1 \leftrightarrow p_1 \end{matrix}\right\} \begin{matrix} \text{performing CDM} \\ \text{on DMRS} \end{matrix} \\ \left.\begin{matrix} layer2 \leftrightarrow p_2 \\ layer3 \leftrightarrow p_3 \\ layer4 \leftrightarrow p_5 \end{matrix}\right\} \begin{matrix} \text{performing CDM} \\ \text{on DMRS} \end{matrix} \end{cases}$ FDM<br><br>Or<br><br>$\begin{cases} \left.\begin{matrix} layer0 \leftrightarrow p_2 \\ layer1 \leftrightarrow p_3 \end{matrix}\right\} \begin{matrix} \text{performing CDM} \\ \text{on DMRS} \end{matrix} \\ \left.\begin{matrix} layer2 \leftrightarrow p_0 \\ layer3 \leftrightarrow p_1 \\ layer4 \leftrightarrow p_4 \end{matrix}\right\} \begin{matrix} \text{performing CDM} \\ \text{on DMRS} \end{matrix} \end{cases}$ FDM |
| 7 | 6 | 2 | $CW0 \leftrightarrow \begin{cases} layer0 \\ layer1 \\ layer2 \end{cases}$ $CW1 \leftrightarrow \begin{cases} layer3 \\ layer4 \\ layer5 \end{cases}$ | $\begin{cases} \left.\begin{matrix} layer0 \leftrightarrow p_0 \\ layer1 \leftrightarrow p_1 \\ layer2 \leftrightarrow p_4 \end{matrix}\right\} \begin{matrix} \text{performing CDM} \\ \text{on DMRS} \end{matrix} \\ \left.\begin{matrix} layer3 \leftrightarrow p_2 \\ layer4 \leftrightarrow p_3 \\ layer5 \leftrightarrow p_5 \end{matrix}\right\} \begin{matrix} \text{performing CDM} \\ \text{on DMRS} \end{matrix} \end{cases}$ FDM<br><br>Or<br><br>$\begin{cases} \left.\begin{matrix} layer0 \leftrightarrow p_2 \\ layer1 \leftrightarrow p_3 \\ layer2 \leftrightarrow p_5 \end{matrix}\right\} \begin{matrix} \text{performing CDM} \\ \text{on DMRS} \end{matrix} \\ \left.\begin{matrix} layer3 \leftrightarrow p_0 \\ layer4 \leftrightarrow p_1 \\ layer5 \leftrightarrow p_4 \end{matrix}\right\} \begin{matrix} \text{performing CDM} \\ \text{on DMRS} \end{matrix} \end{cases}$ FDM |
| 8 | 7 | 2 | $CW0 \leftrightarrow \begin{cases} layer0 \\ layer1 \\ layer2 \end{cases}$ $CW1 \leftrightarrow \begin{cases} layer3 \\ layer4 \\ layer5 \\ layer6 \end{cases}$ | $\begin{cases} \left.\begin{matrix} layer0 \leftrightarrow p_0 \\ layer1 \leftrightarrow p_1 \\ layer2 \leftrightarrow p_4 \end{matrix}\right\} \begin{matrix} \text{performing CDM} \\ \text{on DMRS} \end{matrix} \\ \left.\begin{matrix} layer3 \leftrightarrow p_2 \\ layer4 \leftrightarrow p_3 \\ layer5 \leftrightarrow p_5 \\ layer6 \leftrightarrow p_7 \end{matrix}\right\} \begin{matrix} \text{performing CDM} \\ \text{on DMRS} \end{matrix} \end{cases}$ FDM<br><br>Or<br><br>$\begin{cases} \left.\begin{matrix} layer0 \leftrightarrow p_2 \\ layer1 \leftrightarrow p_3 \\ layer2 \leftrightarrow p_5 \end{matrix}\right\} \begin{matrix} \text{performing CDM} \\ \text{on DMRS} \end{matrix} \\ \left.\begin{matrix} layer3 \leftrightarrow p_0 \\ layer4 \leftrightarrow p_1 \\ layer5 \leftrightarrow p_4 \\ layer6 \leftrightarrow p_6 \end{matrix}\right\} \begin{matrix} \text{performing CDM} \\ \text{on DMRS} \end{matrix} \end{cases}$ FDM |

TABLE 1-1-continued

Mapping manner from each layer corresponding to a codeword stream to a DMRS port in the case of different numbers of layers

| Index | Number of layers | Number of codeword streams | Mapping from codeword stream to layer | Mapping manner from DMRS of each layer of codeword stream to DMRS port |
|---|---|---|---|---|
| 9 | 8 | 2 | $CW0 \leftrightarrow \begin{cases} layer0 \\ layer1 \\ layer2 \\ layer3 \end{cases}$ $CW1 \leftrightarrow \begin{cases} layer4 \\ layer5 \\ layer6 \\ layer7 \end{cases}$ | $\left\{\begin{matrix} \begin{Bmatrix} layer0 \leftrightarrow p_0 \\ layer1 \leftrightarrow p_1 \\ layer2 \leftrightarrow p_4 \\ layer3 \leftrightarrow p_6 \end{Bmatrix} \text{performing CDM on DMRS} \\ \begin{Bmatrix} layer4 \leftrightarrow p_2 \\ layer5 \leftrightarrow p_3 \\ layer6 \leftrightarrow p_5 \\ layer7 \leftrightarrow p_7 \end{Bmatrix} \text{performing CDM on DMRS} \end{matrix}\right\}$ FDM<br><br>Or<br><br>$\left\{\begin{matrix} \begin{Bmatrix} layer0 \leftrightarrow p_2 \\ layer1 \leftrightarrow p_3 \\ layer2 \leftrightarrow p_5 \\ layer3 \leftrightarrow p_7 \end{Bmatrix} \text{performing CDM on DMRS} \\ \begin{Bmatrix} layer4 \leftrightarrow p_0 \\ layer5 \leftrightarrow p_1 \\ layer6 \leftrightarrow p_4 \\ layer7 \leftrightarrow p_6 \end{Bmatrix} \text{performing CDM on DMRS} \end{matrix}\right\}$ FDM |
| 10 | 3 | 1 | $CW0 \leftrightarrow \begin{cases} layer0 \\ layer1 \\ layer2 \end{cases}$ | $\begin{Bmatrix} layer0 \leftrightarrow p_0 \\ layer1 \leftrightarrow p_1 \\ layer2 \leftrightarrow p_2 \end{Bmatrix}$ performing CDM on DMRS $\Big\}$ FDM |
| 11 | 4 | 1 | $CW0 \leftrightarrow \begin{cases} layer0 \\ layer1 \\ layer2 \\ layer3 \end{cases}$ | $\begin{Bmatrix} layer0 \leftrightarrow p_0 \\ layer1 \leftrightarrow p_1 \end{Bmatrix}$ performing CDM on DMRS<br>$\begin{Bmatrix} layer2 \leftrightarrow p_2 \\ layer3 \leftrightarrow p_3 \end{Bmatrix}$ performing CDM on DMRS $\Big\}$ FDM |

When the DMRS corresponding to each layer of the same codeword stream employs FDM/TDM with priority, the DMRS corresponding to each layer of different codeword stream employs CDM with priority. The mapping manner from each layer corresponding to a codeword stream to a DMRS port in the case of different numbers of layers is as shown in Table 1-2.

TABLE 1-2

Mapping manner from each layer corresponding to a codeword stream to a DMRS port in the case of different numbers of layers

| Index | Number of layers | Number of codeword streams | Mapping from codeword stream to layer | Mapping manner from DMRS of each layer of codeword stream to DMRS port |
|---|---|---|---|---|
| 1 | 1 | 1 | $CW0 \leftrightarrow layer0$ | $layer0 \leftrightarrow p_0$ |
| 2 | 2 | 1 | $CW0 \leftrightarrow \begin{cases} layer0 \\ layer1 \end{cases}$ | $\begin{cases} layer0 \leftrightarrow p_0 \\ layer1 \leftrightarrow p_1 \end{cases}$ |
| 3 | 2 | 2 | $CW0 \leftrightarrow layer0$<br>$CW1 \leftrightarrow layer1$ | $\begin{cases} layer0 \leftrightarrow p_0 \\ layer1 \leftrightarrow p_1 \end{cases}$ |
| 4 | 3 | 2 | $CW0 \leftrightarrow layer0$<br>$CW1 \leftrightarrow \begin{cases} layer1 \\ layer2 \end{cases}$ | $\begin{Bmatrix} layer0 \leftrightarrow p_0 \\ layer1 \leftrightarrow p_1 \end{Bmatrix}$ performing CDM on DMRS<br>$layer2 \leftrightarrow p_2$ $\Big\}$ FDM |

TABLE 1-2-continued

Mapping manner from each layer corresponding to a codeword stream to a
DMRS port in the case of different numbers of layers

| Index | Number of layers | Number of codeword streams | Mapping from codeword stream to layer | Mapping manner from DMRS of each layer of codeword stream to DMRS port |
|---|---|---|---|---|
| 5 | 4 | 2 | $CW0 \leftrightarrow \{layer0, layer1\}$<br>$CW1 \leftrightarrow \{layer2, layer3\}$ | $\{layer0 \leftrightarrow p_0, layer2 \leftrightarrow p_1\}$ performing CDM on DMRS<br>$\{layer1 \leftrightarrow p_2, layer3 \leftrightarrow p_3\}$ performing CDM on DMRS $\}$ FDM |
| 6 | 5 | 2 | $CW0 \leftrightarrow \{layer0, layer1\}$<br>$CW1 \leftrightarrow \{layer2, layer3, layer4\}$ | $\{layer0 \leftrightarrow p_0, layer2 \leftrightarrow p_1, layer4 \leftrightarrow p_5\}$ performing CDM on DMRS<br>$\{layer1 \leftrightarrow p_2, layer3 \leftrightarrow p_3\}$ performing CDM on DMRS $\}$ FDM |
| 7 | 6 | 2 | $CW0 \leftrightarrow \{layer0, layer1, layer2\}$<br>$CW1 \leftrightarrow \{layer3, layer4, layer5\}$ | $\{layer0 \leftrightarrow p_0, layer2 \leftrightarrow p_1, layer4 \leftrightarrow p_4\}$ performing CDM on DMRS<br>$\{layer1 \leftrightarrow p_2, layer3 \leftrightarrow p_3, layer5 \leftrightarrow p_5\}$ performing CDM on DMRS $\}$ FDM |
| 8 | 7 | 2 | $CW0 \leftrightarrow \{layer0, layer1, layer2\}$<br>$CW1 \leftrightarrow \{layer3, layer4, layer5, layer6\}$ | $\{layer0 \leftrightarrow p_0, layer2 \leftrightarrow p_1, layer4 \leftrightarrow p_4, layer6 \leftrightarrow p_5\}$ performing CDM on DMRS<br>$\{layer1 \leftrightarrow p_2, layer3 \leftrightarrow p_3, layer5 \leftrightarrow p_7\}$ performing CDM on DMRS $\}$ FDM |
| 9 | 8 | 2 | $CW0 \leftrightarrow \{layer0, layer1, layer2, layer3\}$<br>$CW1 \leftrightarrow \{layer4, layer5, layer6, layer7\}$ | $\{layer0 \leftrightarrow p_0, layer2 \leftrightarrow p_1, layer4 \leftrightarrow p_4, layer6 \leftrightarrow p_6\}$ performing CDM on DMRS<br>$\{layer1 \leftrightarrow p_2, layer3 \leftrightarrow p_3, layer5 \leftrightarrow p_5, layer7 \leftrightarrow p_7\}$ performing CDM on DMRS $\}$ FDM |
| 10 | 3 | 1 | $CW0 \leftrightarrow \{layer0, layer1, layer2\}$ | $\{layer0 \leftrightarrow p_0, layer1 \leftrightarrow p_1\}$ performing CDM on DMRS<br>$\{layer2 \leftrightarrow p_2\}$ $\}$ FDM |
| 11 | 4 | 1 | $CW0 \leftrightarrow \{layer0, layer1, layer2, layer3\}$ | $\{layer0 \leftrightarrow p_0, layer2 \leftrightarrow p_1\}$ performing CDM on DMRS<br>$\{layer1 \leftrightarrow p_2, layer3 \leftrightarrow p_3\}$ performing CDM on DMRS $\}$ FDM |

Taking P=8, L=4 as an example, according to equation (1), the pre-coding vectors corresponding to 4 layers are respectively [$w_0, w_1, w_2, w_3$], and at the same time assume that the number of codeword streams is 2 and CW0 corresponds to layer 0 and layer 1, and CW1 corresponds to layer 1 and layer 2.

According to the mapping manner of Table 1-1, the layers of the same codeword stream correspond to code division multiplexing DMRS ports with priority. As the corresponding manner with the index being $$5 \left\{ \begin{array}{l} layer\ 0 \leftrightarrow p_0 \\ layer\ 1 \leftrightarrow p_1 \\ layer\ 2 \leftrightarrow p_2 \\ layer\ 3 \leftrightarrow p_3 \end{array} \right\} \begin{array}{l} \text{performing CDM on DMRS} \\ \text{performing CDM on DMRS} \end{array} \right\} FDM$$

in Table 1-1; layer 0 corresponds to DMRS port 0, layer 1 corresponds to DMRS port 1, layer 2 corresponds to DMRS port 2, and layer 3 corresponds to DMRS port 3, i.e. the layers of the same codeword stream correspond to code division multiplexing DMRS ports. Therefore, when carrying out pre-coding on the DMRS, DMRS ports 0-3 correspond to weights $[w_0, w_1, w_2, w_3]$ respectively. However, since frequency division multiplexing is carried out on DMRS port group $\{0, 1\}$ and $\{2, 3\}$, the corresponding pre-coding forms of two groups of DMRSs are $$[w_0, w_1, L, w_3] \begin{bmatrix} r_0 \\ r_1 \\ 0 \\ 0 \end{bmatrix} \text{ and } [w_0, w_1, L, w_3] \begin{bmatrix} 0 \\ 0 \\ r_2 \\ r_3 \end{bmatrix}$$

respectively, wherein $r_i$ corresponds to the demodulation reference symbol corresponding to DMRS port i. The pre-coded data are mapped to the corresponding resource units according to the DMRS pattern.

According to the mapping manner of Table 1-2, the layers of the same codeword stream correspond to frequency division multiplexing DMRS ports with priority. As the corresponding mapping manner with the index being

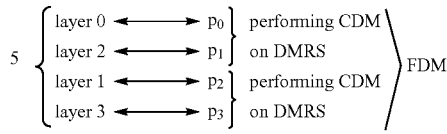

in Table 1-2; layer 0 corresponds to DMRS port 0, layer 1 corresponds to DMRS port 2, layer 2 corresponds to DMRS port 1, and layer 3 corresponds to DMRS port 3, i.e. the same codeword stream correspond to frequency division multiplexing ports. At this moment, when carrying out pre-coding on the DMRS, DMRS ports 0-3 correspond to weights $[w_0, w_1, w_2, w_3]$ respectively. At this moment, the pre-coding forms corresponding to the DMRSs of two CDM groups are $$[w_0, w_1, L, w_L] \begin{bmatrix} r_0 \\ 0 \\ r_2 \\ 0 \end{bmatrix} \text{ and } [w_0, w_1, L, w_L] \begin{bmatrix} 0 \\ r_1 \\ 0 \\ r_3 \end{bmatrix}$$

respectively, and the pre-coded data are mapped to the corresponding resource units according to the DMRS pattern.

In the LTE-A, ports $p_0, p_1, p_2, p_3, p_4, p_5, p_6, p_7$ correspond to ports 7, 8, 9, 10, 11, 12, 13 and 14 respectively.

Embodiment 2

This embodiment takes a MU-MIMO system as an example to describe the mapping process from the layers corresponding to a codeword stream to DMRS ports. In the MU-MIMO, the rule of allocating a DMRS port to each user is that: as to each user, various layers corresponding to the same user are mapped to the DMRS ports with the same multiplexing manner.

In this case, the same multiplexing manner refers to: the layers corresponding to the same user are mapped to the DMRS ports of the port group employing CDM with priority, or the layers corresponding to the same user are mapped to DMRS ports of the port group employing FDM/TDM with priority (i.e. the DMRS ports of different DMRS port groups). The configuration of defining MU-MIMO includes the following parameters:

the maximum number of layers supported by the MU-MIMO system, the maximum number of multiplexing users supported and the maximum number of layers transmitted by each multiplexing user;

the values of the above 3 parameters can be represented with $\{n_1, n_2, n_2\}$ respectively.

Hereinafter, it will be described by taking several different MU-MIMO configurations as an example.

When the configuration of the MU-MIMO is $\{4,2,2\}$ if in the MU-MIMO, it at most allows to use 4 layers for transmission and the maximum number of users supported is 2, and each user supports at most 2 layers, the particular relationship is as shown in Tables 2-1 and 2-2. In this case, Table 2-1 shows the situation that the layers of the same user are mapped with priority to a group of DMRS ports which code division multiplexing is performed on, and Table 2-2 shows the situation that the layers of the same user are mapped with priority to different code division multiplexing groups of DMRS ports.

TABLE 2-1

The layers of the same user are mapped with priority to a group of CDM multiplexing DMRS ports

| Index | Number of layers | Number of users | Mapping from codeword stream to layer | Mapping manner from DMRS of each layer of codeword stream to DMRS port |
|---|---|---|---|---|
|  | 2 | 2 | user0 ↔ layer0<br>user1 ↔ layer1 | $\begin{cases} \text{layer0} \leftrightarrow p_0 \\ \text{layer1} \leftrightarrow p_1 \end{cases}$ |

TABLE 2-1-continued

The layers of the same user are mapped with priority to a group of CDM multiplexing DMRS ports

| Index | Number of layers | Number of users | Mapping from codeword stream to layer | Mapping manner from DMRS of each layer of codeword stream to DMRS port |
|---|---|---|---|---|
| | 3 | 2 | Provided that user0 corresponds to 2 layers; user1 corresponds to 1 layer; user0 ↔ {layer0, layer1} user1 ↔ layer2 | {layer0 ↔ $p_0$, layer1 ↔ $p_1$, layer2 ↔ $p_2$} performing CDM on DMRS } FDM {layer2 ↔ $p_0$, layer0 ↔ $p_2$, layer1 ↔ $p_3$} performing CDM on DMRS } FDM |
| | 4 | 2 | user0 ↔ {layer0, layer1} user1 ↔ {layer2, layer3} | {layer0 ↔ $p_0$, layer1 ↔ $p_1$} performing CDM on DMRS {layer2 ↔ $p_2$, layer3 ↔ $p_3$} performing CDM on DMRS } FDM |

TABLE 2-2

The layers of the same user are mapped to a group of FDM/TDM multiplexing DMRS ports with priority

| Index | Number of layers | Number of users | Mapping from codeword stream to layer | Mapping manner from DMRS of each layer of codeword stream to DMRS port |
|---|---|---|---|---|
| | 2 | 2 | user0 ↔ layer0, user1 ↔ layer1 | {layer0 ↔ $p_0$, layer1 ↔ $p_1$} |
| | 3 | 2 | Provided that user0 corresponds to 2 layers user1 corresponds to 1 layer; user0 ↔ {layer0, layer1} user1 ↔ layer2 | {layer0 ↔ $p_0$, layer1 ↔ $p_1$, layer2 ↔ $p_2$} performing CDM on DMRS } FDM |
| | 4 | 2 | user0 ↔ {layer0, layer1} user1 ↔ {layer2, layer3} | {layer0 ↔ $p_0$, layer2 ↔ $p_1$} performing CDM on DMRS {layer1 ↔ $p_2$, layer3 ↔ $p_3$} performing CDM on DMRS } FDM |

When the configuration of MU-MIMO is {4,4,2}, if MU-MIMO supports the multiplexing of 4 users at most, each user at most can support 2 layers for transmission, and in MU-MIMO, it at most allows to use 4 layers, the mapping relationship is as shown in Tables 2-3 and 2-4. In this case, Table 2-3 shows the situation that the layers of the same user are mapped with priority to a group of DMRS ports on which code division multiplexing is performed, and Table 2-4 shows the situation that the layers of the same user are mapped with priority to different groups of code division multiplexing DMRS ports.

TABLE 2-3

The layers of the same user are mapped with priority to a group of code division multiplexing DMRS ports

| Index | Number of layers | Number of users | Mapping from codeword stream to layer | Mapping manner from DMRS of each layer of codeword stream to DMRS port |
|---|---|---|---|---|
| 1 | 2 | 2 | user0 ↔ layer0, user1 ↔ layer1 | {layer0 ↔ $p_0$, layer1 ↔ $p_1$} |

TABLE 2-3-continued

The layers of the same user are mapped with priority to a group of code division multiplexing DMRS ports

| Index | Number of layers | Number of users | Mapping from codeword stream to layer | Mapping manner from DMRS of each layer of codeword stream to DMRS port |
|---|---|---|---|---|
| 2 | 3 | 2 | Provided that user0 corresponds to 2 layers user1 corresponds to 1 layer; user0 ↔ {layer0, layer1} user1 ↔ layer2 | $\left\{\begin{array}{l}\text{layer0} \leftrightarrow p_0 \\ \text{layer1} \leftrightarrow p_1 \\ \text{layer2} \leftrightarrow p_2\end{array}\right.$ $\left.\begin{array}{l}\text{performing CDM on DMRS}\end{array}\right\}$ FDM |
| 3 | 3 | 3 | user0 ↔ layer0 user1 ↔ layer1 user2 ↔ layer2 | |
| 4 | 4 | 2 | user0 ↔ {layer0, layer1} user1 ↔ {layer2, layer3} | $\left\{\begin{array}{l}\text{layer0} \leftrightarrow p_0 \\ \text{layer1} \leftrightarrow p_1 \\ \text{layer2} \leftrightarrow p_2 \\ \text{layer3} \leftrightarrow p_3\end{array}\right.$ $\left.\begin{array}{l}\text{performing CDM on DMRS} \\ \text{performing CDM on DMRS}\end{array}\right\}$ FDM |
| 5 | 4 | 3 | user0 ↔ {layer0, layer1} user1 ↔ layer2 user2 ↔ layer3 | |
| 6 | 4 | 4 | user0 ↔ layer0 user1 ↔ layer1 user2 ↔ layer2 user3 ↔ layer3 | |

TABLE 2-4

The layers of the same user are mapped with priority to a group of FDM/TDM multiplexing DMRS ports

| Index | Number of layers | Number of users | Mapping from codeword stream to layer | Mapping manner from DMRS of each layer of codeword stream to DMRS port |
|---|---|---|---|---|
| 1 | 2 | 2 | user0 ↔ layer0 user1 ↔ layer1 | $\left\{\begin{array}{l}\text{layer0} \leftrightarrow p_0 \\ \text{layer1} \leftrightarrow p_1\end{array}\right.$ |
| 2 | 3 | 2 | Provided that user0 corresponds to 2 layers user1 corresponds to 1 layer; user0 ↔ {layer0, layer1} user1 ↔ layer2 | $\left\{\begin{array}{l}\text{layer0} \leftrightarrow p_0 \\ \text{layer2} \leftrightarrow p_1 \\ \text{layer1} \leftrightarrow p_2\end{array}\right.$ $\left.\begin{array}{l}\text{performing CDM on DMRS}\end{array}\right\}$ FDM |
| 3 | 3 | 3 | user0 ↔ layer0 user1 ↔ layer1 user2 ↔ layer2 | $\left\{\begin{array}{l}\text{layer0} \leftrightarrow p_0 \\ \text{layer1} \leftrightarrow p_1 \\ \text{layer2} \leftrightarrow p_2\end{array}\right.$ $\left.\begin{array}{l}\text{performing CDM on DMRS}\end{array}\right\}$ FDM |

TABLE 2-4-continued

The layers of the same user are mapped with priority to a group of FDM/TDM multiplexing DMRS ports

| Index | Number of layers | Number of users | Mapping from codeword stream to layer | Mapping manner from DMRS of each layer of codeword stream to DMRS port |
|---|---|---|---|---|
| 4 | 4 | 2 | user0 ↔ {layer0, layer1}<br>user1 ↔ {layer2, layer3} | $\begin{cases} \text{layer0} \leftrightarrow p_0 \\ \text{layer2} \leftrightarrow p_1 \end{cases}$ performing CDM on DMRS<br>$\begin{cases} \text{layer1} \leftrightarrow p_2 \\ \text{layer3} \leftrightarrow p_3 \end{cases}$ performing CDM on DMRS $\Bigg\}$ FDM |
| 5 | 4 | 3 | user0 ↔ {layer0, layer1}<br>user1 ↔ layer2<br>user2 ↔ layer3 | |
| 6 | 4 | 4 | user0 ↔ layer0<br>user1 ↔ layer1<br>user2 ↔ layer2<br>user3 ↔ layer3 | $\begin{cases} \text{layer0} \leftrightarrow p_0 \\ \text{layer1} \leftrightarrow p_1 \end{cases}$ performing CDM on DMRS<br>$\begin{cases} \text{layer2} \leftrightarrow p_2 \\ \text{layer3} \leftrightarrow p_3 \end{cases}$ performing CDM on DMRS $\Bigg\}$ FDM |

When the configuration of MU-MIMO is {4,4,1} if MU-MIMO at most supports the multiplexing of 4 users, each user at most can support 1 layer for transmission, and in MU-MIMO, it at most allows to use 4 layers, the mapping relationship is as shown in Tables 2-5 and 2-6. In this case, Table 2-5 shows the situation that the layers of the same user are mapped with priority to a group of DMRS ports on which code division multiplexing is performed, and Table 2-6 shows the situation that the layers of the same user are mapped with priority to different groups of code division multiplexing DMRS ports.

TABLE 2-5

The layers of the same user are mapped with priority to a group of CDM multiplexing DMRS ports

| Index | Number of layers | Number of users | Mapping from codeword stream to layer | Mapping manner from DMRS of each layer of codeword stream to DMRS port |
|---|---|---|---|---|
| 1 | 2 | 2 | user0 ↔ layer0<br>user1 ↔ layer1 | $\begin{cases} \text{layer0} \leftrightarrow p_0 \\ \text{layer1} \leftrightarrow p_1 \end{cases}$ |
| 2 | 3 | 3 | user0 ↔ layer0<br>user1 ↔ layer1<br>user2 ↔ layer2 | |
| 3 | 4 | 4 | user0 ↔ layer0<br>user1 ↔ layer1<br>user2 ↔ layer2<br>user3 ↔ layer3 | $\begin{cases} \text{layer0} \leftrightarrow p_0 \\ \text{layer1} \leftrightarrow p_1 \end{cases}$ performing CDM on DMRS<br>$\begin{cases} \text{layer2} \leftrightarrow p_2 \\ \text{layer3} \leftrightarrow p_3 \end{cases}$ performing CDM on DMRS $\Bigg\}$ FDM |

TABLE 2-6

The layers of the same user are mapped with priority to a group of FDM/TDM multiplexing DMRS ports

| Index | Number of layers | Number of users | Mapping from codeword stream to layer | Mapping manner from DMRS of each layer of codeword stream to DMRS port |
|---|---|---|---|---|
| 1 | 2 | 2 | user0 ↔ layer0<br>user1 ↔ layer1 | $\begin{cases} \text{layer0} \leftrightarrow p_0 \\ \text{layer1} \leftrightarrow p_1 \end{cases}$ |

TABLE 2-6-continued

The layers of the same user are mapped with priority to a group of FDM/TDM multiplexing DMRS ports

| Index | Number of layers | Number of users | Mapping from codeword stream to layer | Mapping manner from DMRS of each layer of codeword stream to DMRS port | |
|---|---|---|---|---|---|
| 2 | 3 | 3 | user0 ↔ layer0<br>user1 ↔ layer1<br>user2 ↔ layer2 | $\left\{\begin{array}{l}\text{layer0} \leftrightarrow p_0 \\ \text{layer1} \leftrightarrow p_1 \\ \text{layer2} \leftrightarrow p_2\end{array}\right\}$ performing CDM on DMRS | FDM |
| 3 | 4 | 4 | user0 ↔ layer0<br>user1 ↔ layer1<br>user2 ↔ layer2<br>user3 ↔ layer3 | $\left\{\begin{array}{l}\text{layer0} \leftrightarrow p_0 \\ \text{layer1} \leftrightarrow p_1\end{array}\right\}$ performing CDM on DMRS<br>$\left\{\begin{array}{l}\text{layer2} \leftrightarrow p_2 \\ \text{layer3} \leftrightarrow p_3\end{array}\right\}$ performing CDM on DMRS | FDM |

Embodiment 3

In this embodiment, SU-MIMO and MU-MIMO employ a unified mapping manner from layer to DMRS port, and considering that SU-MIMO and MU-MIMO employ a fixed mapping from layer to DMRS port, a fixed relationship can be set between the layer and DMRS port, and DMRS ports $\{p_0, p_1, p_2, p_3, p_4, p_5, p_6, p_7\}$ are defined. It is in particular as follows:

when the number of layers is less than or equal to 2, the relationship between layer and DMRS port can be set as:
layer0 ↔ port0
layer1 ↔ port1 when the number of layers is greater than 2 and less than or equal to 4, the relationship between layer and DMRS port can be set as:
layer0 ↔ port0
layer1 ↔ port1
layer2 ↔ port2
layer3 ↔ port3 when the number of layers is greater than 4 and less than or equal to 8, the relationship between layer and DMRS port can be set as:
layer0 ↔ port0
layer1 ↔ port1
layer2 ↔ port2
layer3 ↔ port3
layer4 ↔ port4
layer5 ↔ port6
layer6 ↔ port5
layer7 ↔ port7

In this case, in the LTE-A, $\{p_0, p_1, p_2, p_3, p_4, p_5, p_6, p_7\}$ are DMRS ports 7, 8, 9, 10, 11, 12, 13 and 14 respectively.

Those skilled in the art shall understand that all of or part of the steps in the above methods can be completed by instructing relevant hardware by programs, and the programs can be stored in a computer readable storage medium, such as read only memory, magnetic disk, or optical disk, etc. Optionally, all of or part of the steps of the above embodiments can also be implemented by using one or more integrated circuits. Accordingly, the modules/units in the above embodiments can be implemented in the form of hardware and can also be implemented in the form of software function modules. The present invention is not limited to any particular form of combination of hardware and software.

Above description is only to illustrate the preferred embodiments but not to limit the present invention. Various alternations and changes of the present invention are apparent to those skilled in the art. Any modification, equivalent substitution and improvement and so on made within the spirit and principle of the present invention should be included in the protection scope of appended claims of the present invention.

INDUSTRIAL APPLICABILITY

By way of the technical solution of the present invention, interference between the corresponding layers of different codeword streams can be avoided, and the accuracy of channel estimation can be improved. At the same time, since the technical solution of the present invention employs a fixed mapping manner, the probability of random mapping is reduced and the overhead of the control signaling is also reduced.

What we claim is:

1. A pre-coding method for a hybrid multiplexing demodulation reference symbol (DMRS), comprising:
    determining the hybrid multiplexing relationship between DMRS ports;
    making layers of data transport respectively correspond to DMRS ports with the hybrid multiplexing relationship determined; and
    pre-coding pilot sequences corresponding to various DMRS ports according to a relationship between the layers of data transport and the DMRS ports;
    wherein the step of determining the hybrid multiplexing relationship between the DMRS ports comprises:
    classifying DMRS ports 7, 8, 11 and 13 as one DMRS port group, and classifying DMRS ports 9, 10, 12 and 14 as another DMRS port group, wherein a code division multiplexing manner is employed among the DMRS ports within each of the classified DMRS port groups, and a time division and/or frequency division multiplexing manner is employed among the different DMRS port groups.

2. The method as claimed in claim 1, wherein
    the step of making layers of data transport respectively correspond to DMRS ports with the hybrid multiplexing relationship determined refers to making layers correspond to the DMRS ports according to any one or a combination of a plurality of conditions as follows:
    making all the layers of data transport uniformly correspond to the DMRS ports in two classified DMRS port groups;

making all layers correspond to the DMRS ports in two classified DMRS port groups according to a relationship between each codeword stream and the layer of data transport.

3. The method as claimed in claim 2, wherein
the step of making all the layers correspond to the DMRS ports in two classified DMRS port groups according to the relationship between each codeword stream and the layer of data transport comprises:
making layers of same codeword stream correspond to the DMRS ports of same DMRS port group with priority, and making layers of different codeword streams correspond to the DMRS ports of different DMRS port groups respectively; or
making the layers of the same codeword stream correspond to the DMRS ports of different DMRS port groups with priority, and making the layers of different codeword streams correspond to the DMRS ports of the same DMRS port group.

4. The method as claimed in claim 3, wherein in the step of making layers of same codeword stream correspond to the DMRS ports of same DMRS port group with priority and making the layers of different codeword streams correspond to the DMRS ports of different DMRS port groups respectively,
when the total number M of layers corresponding to the same codeword stream is greater than the maximum number N of ports supported by one DMRS port group, make N layers in all layers corresponding to the same codeword stream correspond to the DMRS ports of the same DMRS port group with priority, then make remaining M-N layers correspond to the DMRS ports of different DMRS port groups, or
make N layers in all layers corresponding to the same codeword stream correspond to the DMRS ports of different DMRS port groups with priority, then make the remaining M-N layers correspond to the DMRS ports of the same DMRS port group;
or
when said all layers correspond to two codeword streams, make layers corresponding to one codeword stream therein correspond to the DMRS ports of one DMRS port group, and make layers corresponding to the other codeword stream correspond to the DMRS ports of another DMRS port group.

5. The method as claimed in claim 1, wherein
the step of making layers of data transport respectively correspond to DMRS ports with the hybrid multiplexing relationship determined refers to:
configuring one-to-one fixed mapping relationships according to sequence numbers of the layer and DMRS port.

6. The method as claimed in claim 3, further comprising:
when the method is used in a multi-user multi-input multi-output (MU-MIMO) system, taking layers corresponding to same multiplexing user as layers corresponding to the same codeword stream to carry out mapping from layer to DMRS port,
preferably
ranking various multiplexing users from high to low according to the total number of layers corresponding to various multiplexing users, and allocating DMRS ports to layers corresponding to each multiplexing user successively according to rank locations.

7. A method for mapping from a layer to a multiplexing demodulation reference symbol (DMRS) port, applied in a pre-coding method based on a hybrid multiplexing DMRS, characterized in that the method comprises:
determining the hybrid multiplexing relationship between DMRS ports; and
making layers of data transport respectively correspond to DMRS ports with the hybrid multiplexing relationship determined;
wherein the step of determining the hybrid multiplexing relationship between the DMRS ports comprises:
classifying DMRS ports 7, 8, 11 and 13 as one DMRS port group, and classifying DMRS ports 9, 10, 12 and 14 as another DMRS port group, wherein a code division multiplexing manner is employed among the DMRS ports within each of the classified DMRS port groups, and a time division and/or frequency division multiplexing manner is employed among the different DMRS port groups.

8. The method as claimed in claim 7, wherein
in the step of making layers of data transport respectively correspond to DMRS ports with the hybrid multiplexing relationship determined, layers are made to correspond to the DMRS ports according to any one or a combination of a plurality of conditions as follows:
making all the layers of data transport uniformly correspond to the DMRS ports of two classified DMRS port groups;
making all the layers correspond to the DMRS ports of two classified DMRS port groups according to a relationship between each codeword stream and the layer of data transport.

9. The method as claimed in claim 8, wherein
the step of making all the layers correspond to the DMRS ports of two classified DMRS port groups according to the relationship between each codeword stream and the layer of data transport comprises:
making layers of same codeword stream correspond to the DMRS ports of same DMRS port group with priority, and making layers of different codeword streams correspond to the DMRS ports of different DMRS port groups respectively; or
making the layers of the same codeword stream correspond to the DMRS ports of different DMRS port groups with priority, and making the layers of different codeword streams correspond to the DMRS ports of the same DMRS port group.

10. The method as claimed in claim 9, wherein the step of making the layers correspond to the DMRS ports further comprises:
when the total number M of layers corresponding to the same codeword stream is greater than the maximum number N of ports supported by the DMRS port group, making N layers in all layers corresponding to the same codeword stream correspond to the DMRS ports of the same DMRS port group with priority, then making remaining M-N layers correspond to the DMRS ports of different DMRS port groups, or
making N layers in all layers corresponding to the same codeword stream correspond to the DMRS ports of different DMRS port groups with priority, then making the remaining M-N layers correspond to the DMRS ports of the same DMRS port group;
or
when all layers correspond to two codeword streams, making layers corresponding to one codeword stream therein correspond to the DMRS ports of one DMRS port group, and making layers corresponding to the other codeword stream correspond to the DMRS ports of another DMRS port group.

11. The method as claimed in claim 7, wherein
the step of making layers of data transport respectively correspond to DMRS ports with the hybrid multiplexing relationship determined comprises:
configuring one-to-one fixed mapping relationships according to sequence numbers of the layer and DMRS port.

12. The method as claimed in claim 9, further comprising:
when the method is used in a MU-MIMO system, taking layers corresponding to same multiplexing user as layers corresponding to the same codeword stream to carry out mapping from layer to DMRS port,
preferably
ranking various multiplexing users from high to low according to the total number of layers corresponding to various multiplexing users, and allocating DMRS ports to layers corresponding to each multiplexing user successively according to rank locations.

13. An apparatus for achieving pre-coding based on a hybrid multiplexing demodulation reference symbol (DMRS), comprising a processor and a storage device, wherein the storage device stores programs executable by the processor, and the programs comprise a mapping module and a pre-coding module, wherein
the mapping module is configured to: determine a hybrid multiplexing relationship between DMRS ports and make layers of data transport respectively correspond to various DMRS ports with the hybrid multiplexing relationship determined; and
the pre-coding module is configured to: pre-code pilot sequences corresponding to various DMRS ports according to a relationship between the layers of data transport and the DMRS ports;
wherein the mapping module is configured to determine the hybrid multiplexing relationship between the DMRS ports according to a following manner:
classifying DMRS ports 7, 8, 11 and 13 as one DMRS port group, and classifying DMRS ports 9, 10, 12 and 14 as another DMRS port group, wherein a code division multiplexing manner is employed among the DMRS ports within each of the classified DMRS port groups, and a time division and/or frequency division multiplexing manner is employed among the different DMRS port groups.

14. The apparatus as claimed in claim 13, wherein
the mapping module is configured to make the layers of data transport respectively correspond to various DMRS ports with the hybrid multiplexing relationship determined according to any one or a combination of two conditions as follows:
making all the layers of data transport uniformly correspond to the DMRS ports of two classified DMRS port groups;
making all layers correspond to the DMRS ports of two classified DMRS port groups according to a relationship between each codeword stream and the layer of data transport;
wherein making all the layers correspond to the DMRS ports of two classified DMRS port groups according to the relationship between each codeword stream and the layer of data transport comprises:
making layers of same codeword stream correspond to the DMRS ports of same DMRS port group with priority, and making layers of different codeword streams correspond to the DMRS ports of different DMRS port groups respectively; or
making the layers of the same codeword stream correspond to the DMRS ports of different DMRS port groups with priority, and making the layers of different codeword streams correspond to the DMRS ports of the same DMRS port group.

15. The apparatus as claimed in claim 14, wherein
the mapping module is further configured to make the layers correspond to the DMRS ports according to a following manner:
when the total number M of layers corresponding to the same codeword stream is greater than the maximum number N of ports supported by the DMRS port group, making N layers in all layers corresponding to the same codeword stream correspond to the DMRS ports of the same DMRS port group with priority, then making remaining M-N layers correspond to the DMRS ports of different DMRS port groups; or
making N layers in all the layers corresponding to the same codeword stream correspond to the DMRS ports of different DMRS port groups with priority, then making the remaining M-N layers correspond to the DMRS ports of the same DMRS port group;
when all DMRS layers correspond to two codeword streams, making the DMRS layers corresponding to one codeword stream therein correspond to the DMRS ports of one DMRS port group, and making the DMRS layers corresponding to the other codeword stream correspond to the DMRS ports of another DMRS port group.

* * * * *